(12) United States Patent
Chang et al.

(10) Patent No.: US 8,808,905 B2
(45) Date of Patent: Aug. 19, 2014

(54) CYLINDER TYPE LITHIUM ION SECONDARY BATTERY

(75) Inventors: Seok Gyun Chang, Yongin-si (KR); Woongju Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1566 days.

(21) Appl. No.: 11/643,995

(22) Filed: Dec. 22, 2006

(65) Prior Publication Data
US 2007/0105016 A1 May 10, 2007

(30) Foreign Application Priority Data
Dec. 29, 2005 (KR) .................. 10-2005-0134545

(51) Int. Cl.
*H01M 2/08* (2006.01)
(52) U.S. Cl.
USPC .......................................... 429/174; 429/181
(58) Field of Classification Search
USPC .................................................. 429/174, 181
See application file for complete search history.

(56) References Cited

U.S. PATENT DOCUMENTS

| | | | |
|---|---|---|---|
| 6,811,920 B2 | 11/2004 | Murashige et al. | |
| 2006/0188779 A1* | 8/2006 | Yoppolo et al. | 429/174 |

FOREIGN PATENT DOCUMENTS

| | | |
|---|---|---|
| JP | 2001-273932 | 10/2001 |
| JP | 2003-317805 | 11/2003 |

OTHER PUBLICATIONS

English machine translation of Japanese Publication 2001-273932 listed above, 8 pages.

* cited by examiner

*Primary Examiner* — Mark F Huff
*Assistant Examiner* — Monique Wills
(74) *Attorney, Agent, or Firm* — Christie, Parker & Hale, LLP

(57) ABSTRACT

A cylinder type lithium ion secondary battery has a center pin that is inserted into an electrode assembly after the injection of electrolyte to increase impregnation of the electrolyte. The battery includes an electrode assembly, a case to accommodate the electrode assembly, a center pin inserted into the center of the electrode assembly, a cap assembly to seal an upper end opening of the electrode assembly, and an upper insulating plate disposed between the electrode assembly and the cap assembly. The upper insulating plate has a hollow formed in the center through which the center pin can penetrate, and the hollow has a center pin separation preventing unit bendable only toward the electrode assembly when the center pin penetrates through the hollow.

24 Claims, 4 Drawing Sheets

CYLINDER TYPE LITHIUM ION SECONDARY BATTERY

CROSS-REFERENCE TO RELATED APPLICATION

This application claims the benefits of Korean Patent Application No. 2005-134545, filed Dec. 29, 2005 in the Korean Intellectual Property Office, the disclosure of which is incorporated herein by reference.

BACKGROUND OF THE INVENTION

1. Field of the Invention

Aspects of the present invention relate to a cylinder type lithium ion secondary battery, and more particularly, to a cylinder type lithium ion secondary battery in which a center pin separating prevention part is formed in a hollow of an upper insulating plate to be preferentially bent toward an electrode assembly to enable insertion of the center pin after injection of electrolyte and to improve impregnation of the electrolyte.

2. Description of the Related Art

Recently, compact and light electrical and electronic apparatuses, such as mobile telephones, notebook computers, and camcorders, have been actively developed and produced. Battery packs are often built in with the portable electrical and electronic apparatuses so that the portable electrical and electronic apparatuses can operate at a location where an additional power source is not provided or available. The built in battery pack includes at least one battery to output a voltage of a uniform level to drive the portable electrical and electronic apparatus for a predetermined period.

An economical type of the battery back that came into use recently is a secondary battery that can be charged and discharged. Types of the secondary batteries include an Ni—Cd battery (a nickel-cadmium battery), an Ni—H battery (a nickel hydrogen battery), an Ni—MH battery (a nickel metal hydride battery) and a lithium ion secondary battery, such as a lithium battery and a lithium ion battery.

In particular, the operation voltage of the lithium ion secondary battery is commonly 3.6V, which is three times higher than the operation voltages of the Ni—Cd battery and the Ni—MH battery that are widely used today as power sources of the portable electronic apparatuses. As the energy density per unit weigh of the lithium ion secondary battery is also high, the use of the lithium ion secondary battery is rapidly increasing.

In the lithium ion secondary battery, lithium based oxides are used as positive electrode active materials and carbon materials are used as negative electrode active materials. In general, the lithium ion secondary battery is divided into a liquid electrolyte battery and a polymer electrolyte battery according to an electrolyte that is used. The lithium ion secondary battery in which the liquid electrolyte is used is referred to as a lithium ion battery and the lithium ion secondary battery in which the polymer electrolyte is used is referred to as a lithium polymer battery. The lithium ion secondary battery is manufactured to have various shapes and is appropriately referred to as a cylinder type, a polygon type, or a pouch type.

In general, the cylinder type lithium ion secondary battery includes an electrode assembly obtained by winding various components into a cylinder. The elements include a positive electrode plate coated with positive active materials, a negative electrode plate coated with negative active materials, and a separator positioned between the positive electrode plate and the negative electrode plate to prevent the positive electrode plate and the negative electrode plate from being shorted and to move only lithium ions, a cylinder shaped case to accommodate the electrode assembly and an electrolyte, and a cap assembly to seal the cylinder shaped case.

The cylinder type lithium ion secondary battery is manufactured by the following method. First, the positive electrode plate coated with the positive active materials is connected to a positive electrode tab and the negative electrode plate coated with the negative active materials is connected to a negative electrode tab. Then the coated positive electrode plate, the coated negative electrode plate, and the separator are laminated with each other. Thereafter, the laminated positive electrode plate, the negative electrode plate, and the separator are cylindrically wound to manufacture an electrode assembly. Then, the cylindrically wound electrode assembly is accommodated in the cylinder type (or shaped) case so that the electrode assembly is held within the case, the electrolyte is injected into the cylinder type case, and, the cylinder type case is sealed up by a cap assembly to complete the manufacture of the cylinder type lithium ion secondary battery.

Before inserting the electrode assembly into the cylinder type case, a lower insulating plate is inserted in order for the lower insulating plate to insulate the electrode assembly and the cylinder type case from each other. After inserting the electrode assembly into the cylinder type case and before sealing up the cylinder type case, an upper insulating plate is inserted in order for the upper insulating plate to insulate the electrode assembly and the cap assembly from each other. Meanwhile, a center pin is inserted into the central area of the wound electrode assembly to prevent the electrode assembly from becoming dislodged from the cylinder type case and to be used as a discharging path when gas is generated in the battery. Generally, after the insertion of the center pin into the central area of the electrode assembly, the electrolyte is injected. By inserting the center pin, the electrode assembly is more closely pressed against the case by the center pin and the various layers of the electrode assembly itself are pressed. Since the impregnation rate of the electrolyte is reduced with the center pin already inserted, it is advantageous to insert the center pin after the injection of the electrolyte in order to increase the impregnation of the electrolyte in the electrode assembly.

In the case of the polygon type lithium ion secondary battery, additional elements are further included. These include an insulating case to support the cap assembly and to insulate a terminal plate and the electrode assembly from each other.

However, the related art upper insulating plate is configured such that a diameter of a hollow formed in the upper insulating plate is smaller than the outer diameter of the center pin. The configuration prevents the center pin from separating from the electrode assembly when a shock, a jolt, or a blow is applied such as when the battery is dropped. Accordingly, it is impossible to insert the center pin after injecting the electrolyte. Moreover, although the diameter of the hollow formed in the upper insulating plate can be enlarged to be greater than that of the outer diameter of the center pin to enable the center pin to be inserted after the electrolyte is injected, the center pin then may be dislodged upward and become separated from the upper insulating plate to strike the lower side of a safety vent of a cap when an external shock or a blow is applied to the lithium ion secondary battery.

SUMMARY OF THE INVENTION

In view of the above, aspects of the present invention include a cylinder type lithium ion secondary battery in which a center pin separating prevention part is formed in a hole of an upper insulating plate to be bent only toward en electrode assembly such that the center pin can be inserted after the injection of electrolyte so that impregnation of the electrolyte is improved, separation of the center pin toward a cap assembly is prevented even when an external shock is applied to the battery, and safety is secured.

According to aspects of the present invention, a lithium ion secondary battery includes an electrode assembly, a case to accommodate the electrode assembly, a center pin inserted into the center of the electrode assembly, a cap assembly to seal an upper end opening of the case, and an upper insulating plate disposed between the electrode assembly and the cap assembly and having a hollow formed in the center through which the center pin can penetrate. The hollow has a center pin separation preventing unit effectively bendable only toward the electrode assembly when the center pin penetrates through the hollow. In this case, the center pin separation preventing unit may be restored to be parallel to the surface of the upper insulating plate after the center pin is inserted into the hollow.

Moreover, the center pin separation preventing unit may have an arrow shape and a plural number of the center pin separation preventing unit.

The center pin separation preventing unit includes a deforming portion connected to the hollow and bendable toward the electrode assembly when the center pin is inserted, and a rotation portion connected to an end of the deforming portion and to rotate toward the electrode assembly about the deforming portion by a predetermined angle when the center pin is inserted. The deforming portion is preferably disposed lower than the central portion of the upper insulating plate in the thickness direction of the upper insulating plate.

Moreover, the deforming portion has a rectangular cross-section in the thickness direction of the upper insulating plate and may be made of an elastic material. In this case, the elastic material may be any one selected from the group of polyethylene terephthalate (PET), polyethylene (PE), polypropylene (PP), and polyimide (PI). The rotation portion may have a right triangular cross-section, and the right triangular shape has a side perpendicular to the thickness direction of the upper insulating plate as a lower side thereof and a side parallel to the thickness direction of the upper insulating plate as a right angled side thereof, and the right angled side is connected to the deforming portion. In this case, a length of the deforming portion is preferably shorter than a length of the lower side of the rotation portion. The lower side is preferably connected to an end of the right angled side by an oblique side, and the oblique side is obliquely formed at a predetermined angle to the right angle side.

Moreover, the upper insulating plate may have a plurality of recesses. The recesses are formed from near the hollow to the outermost circumference in the radial direction of the upper insulating plate.

According to aspects of the present invention, an insulating plate of a battery that is usable with a center pin and an electric tab includes a first perforation with at least one lock to enable only one way passage of the center pin, and a second perforation to enable penetration by the electrical tab.

According to aspects of the present invention, a lithium ion secondary battery includes a center pin, and an insulating plate, wherein the insulating plate includes a hollow and a center pin restrainer that is sufficiently bendable only towards the interior of the lithium ion secondary battery to enable the center pin to penetrate through the hollow in a first direction.

According to aspects of the present invention, a method of forming a lithium ion secondary battery includes inserting an electrode assembly into a battery case, inserting a positive electrode plate into the battery case over the electrode assembly, injecting electrolyte into the electrode assembly through the positive electrode plate, and inserting a central pin through the positive electrode plate into the electrode assembly after the injecting of the electrolyte.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which.

DETAILED DESCRIPTION OF THE EMBODIMENTS

Reference will now be made in detail to the aspects of the present invention, examples of which are illustrated in the accompanying drawings, wherein like reference numerals refer to the like elements throughout. The aspects are described below in order to explain the present invention by referring to the figures.

Figure 1:
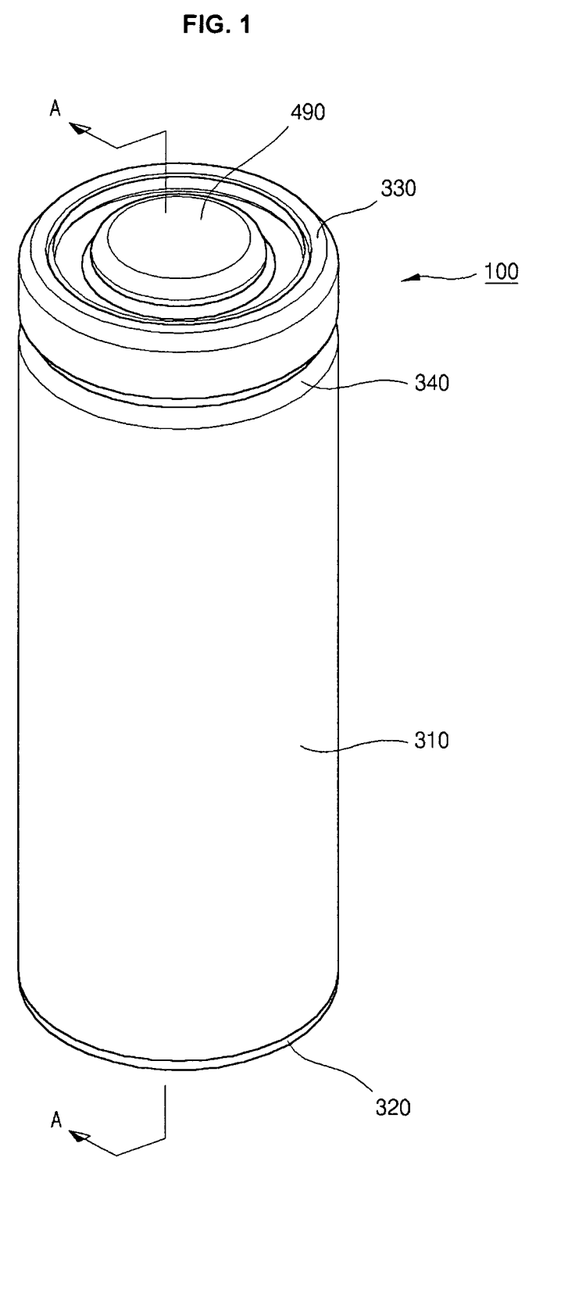
FIG. 1 is a perspective view of a cylinder type lithium ion secondary battery according to an aspect of the present invention.
Figure 2:
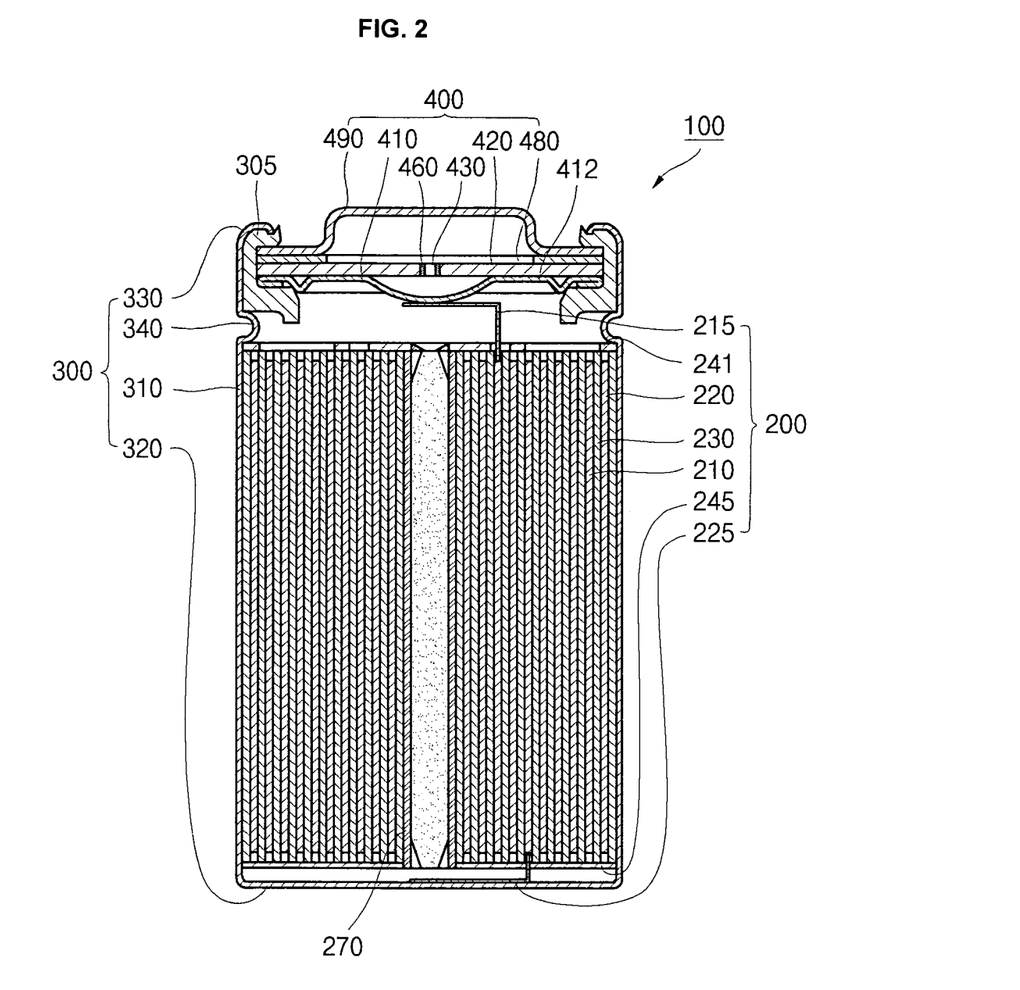
FIG. 2 is a sectional view taken along the line A-A in FIG. 1.

FIG. 1 is a perspective view of a cylinder type lithium ion secondary battery according to an aspect of the present invention, and FIG. 2 is a sectional view taken along the line A-A in FIG. 1. As shown in FIGS. 1 and 2, a cylinder type (or shaped) lithium ion secondary battery 100, includes an electrode assembly 200, a cylinder type (or shaped) case 300 to accommodate the electrode assembly 200 and electrolyte, and a cap assembly 400 assembled (or attached) to the upper side of the cylinder type case 300 to seal the cylinder type case 300 and to allow electric current generated from the electrode assembly 200 to flow toward external devices.

As shown in FIG. 2, the electrode assembly 200, can be formed by winding a positive electrode plate 210 whose positive electrode collector is coated with positive electrode active materials, a negative electrode plate 220 whose negative electrode collector is coated with negative electrode active materials, and a separator 230 disposed between the positive electrode plate 210 and the negative electrode plate 220 to electrically insulate between the positive electrode plate 210 and the negative electrode plate 220, in the form of a jelly-roll.

The positive electrode plate 210 can include a positive electrode collector. The positive electrode collector may be made of a thin metal plate with high or excellent conductivity. A non-limiting example thereof may be aluminum (Al). In addition, positive electrode active materials are coated on the surfaces of the positive electrode collector. A non-limiting example thereof may be excide lithium, such as $LiCoO_2$, $LiMn_2O_4$, $LiNiO_2$, and $LiMnO_2$, or any combinations thereof. On the lateral side ends of the positive electrode plate 210 are areas of positive electrode collector where the positive electrode active material layer is not coated or formed. That is, a positive electrode non-coated portion is formed on the positive electrode plate 210. A positive electrode tab 215 is connected to an end of the positive electrode non-coated portion. The positive electrode tab 215 is made to protrude from the upper side of the electrode assembly 200 by a predetermined length. In a non-limiting aspect, the positive electrode tab 215 is made of aluminum (Al). It is understood that the positive electrode tab 215 may be formed of any conductive material, including metal or conductive polymers.

The negative electrode plate 220 can include a negative electrode collector. The negative electrode collector may be made of a conductive thin metal plate. A non-limiting example thereof may be copper (Cu) and/or Nickel (Ni) foil. In addition, negative electrode active materials are coated on the surfaces of the negative electrode collector. On the lateral side ends of the negative electrode plate 220 are areas of the negative electrode collector where the negative electrode active material layer are not coated or formed. That is, a negative electrode non-coated portion is formed on the negative electrode plate 220. A negative electrode tab 225 is connected to an end of the negative electrode non-coated portion. The negative electrode tab 225 is made to protrude from the lower side of the electrode assembly 200 by a predetermined length. In a non-limiting aspect, the negative electrode tab 225 is made of Nickel (Ni). It is understood that the negative electrode tab 225 may be formed of any conductive material, including metal or conductive polymers. In addition, insulating plates 241 and 245 can be disposed in the upper and lower sides of the electrode assembly 200 to prevent the electrode assembly 200 from contacting the cap assembly 400 or the cylinder type case 300.

As shown in FIG. 2, the cylinder type (shaped) case 300 includes a cylinder type (shaped) side plate 310 having a predetermined diameter so that a predetermined space is formed therein in which the cylinder type (shaped) electrode assembly 200 is accommodated, and a bottom plate 320 to seal up the lower part of the cylinder type side plate 310. The upper part of the cylinder type side plate 310 can be opened so that the electrode assembly 200 is inserted. The negative electrode tab 225 of the electrode assembly 200 can be connected to the center of the bottom plate 320 of the cylinder type case 300 so that the cylinder type case 300 can function as the negative electrode of the cylinder type lithium ion secondary battery 100. In a non-limiting aspect, the cylinder type case 300 can be formed of aluminum (Al), steel (Fe), or an alloy of the above metals.

As shown in FIG. 2, the cylinder type case 300 further includes a crimping unit (a crimped or buckled portion) 330 curved or curled inward. The crimping unit 330 is formed to press the upper part of the cap assembly 400. The cylinder case 300 also includes a beading unit 340 that recesses (or bulges) inward. The beading unit 340 is formed to press the lower part of the cap assembly 400, and is formed in a position separated from the crimping unit 330 by a distance that corresponds to the thickness of the cap assembly 400.

As shown in FIG. 2, the cap assembly 400 can include a safety vent 410, a current intercepting unit 420, a secondary protecting device 480, and a cap up (or a cap top) 490. A protrusion that protrudes downward can be formed in the center of the plate-shaped safety vent 410. The protrusion is positioned to protrude towards the lower part of the cap assembly 400 so that it may be transformed (or pushed) upward by a pressure generated in the secondary battery. Welded to a predetermined position on the bottom of the safety vent 410 is the positive electrode tab 215. The positive electrode tab 215 protrudes from the electrode assembly 200. The positive tab 215 is attached or welded to the predetermined position of the bottom of the safety vent 410 to electrically connect the safety vent 410 and the positive electrode plate 210 of the electrode assembly 200. Similarly, the negative electrode tab 225 protrudes from the electrode assembly 200 to contact the case 300 and be electrically connected to the negative electrode plate 220.

Figure 3:
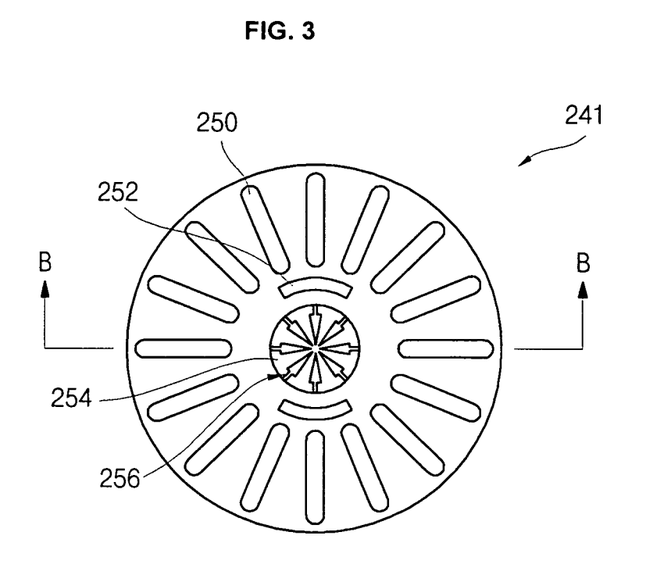
FIG. 3 is a plan view of an upper insulating plate according to an aspect of the present invention.
Figure 4A:
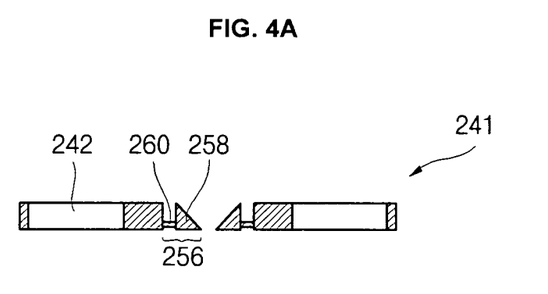
FIG. 4A is a sectional view taken along the line B-B in FIG. 3.
Figure 4B:
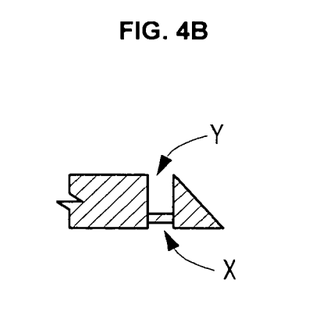
FIG. 4B is a magnified view of a portion of FIG. 4A.

FIG. 3 is a plan view of an upper insulating plate according to an aspect of the present invention, and FIG. 4A is a sectional view taken along the line B-B in FIG. 3, and FIG. 4B is a magnified view of a portion of FIG. 4A. As shown in FIG. 2, the upper insulating plate 241 is disposed between the cap assembly 400 and the upper side of the electrode assembly 200. Particularly, the upper insulating plate 241 is disposed between the safety vent 410 and the upper side of the electrode assembly 200. The upper insulating plate 241 prevents a short that may be generated between the cap assembly 400 and the electrode assembly 200. As shown, the electrical connection between the safety vent 410 and the electrode assembly 200 is by way of the positive electrode tab 215.

As shown in FIG. 3, a non-limiting aspect of the upper insulating plate 241 includes radial recesses 250, positive electrode tab holes 252, a hollow 254, and a center pin separation preventing unit 256. The radial recesses 250 serve as passages through which the electrolyte is injected to impregnate the electrode assembly 200. The positive electrode tab holes 252 serve as passages through which the positive electrode tab 215 penetrates. The hollow 254 enables a center pin 270 to be inserted therethrough, and contacts (or presses) one end of the center pin 270.

As shown in FIG. 3, the radial holes (or recesses) 250 are formed from near the hollow 254 to the outermost circumference of the upper insulating plate 241, and are formed to appear as spokes on a wheel. The plurality of the radial recesses 250 enable for a smooth impregnation of the electrolyte. The size, shape, and number of the radial recesses 250 are not limited as long as they enable the upper insulating plate 241 to prevent a short from occurring between the upper side of the electrode assembly 200 and the cap assembly 400. Finally, the center pin separation preventing unit 256 (also referred to as a center pin lock or a direction biased lock) is formed on the upper insulating plate 241 to enable the center pin 270 to be inserted through the hollow 254 after the upper insulating plate 241 is installed in the case 300 but prevent the center pin 270 from being withdrawn or dislodged through the hollow 254.

In a non-limiting example shown in FIG. 3, the center pin separation preventing unit 256 is configured to be preferentially bent toward the lower side of the battery (toward the electrode assembly 200) but not toward the upper side of the battery (toward the cap assembly 400). Accordingly, the center pin separation preventing unit 256 is biased (or predisposed) in its bending direction to enable one way passage of the center pin. (This is similar or may be analogized to a cable tie to affirmatively bind a number of cables used inside a computer main body. In the computer, the cable tie is configured with a flat wire having recesses or teeth formed on only one surface. When the flat wire is pushed into a triangular hole having a hinge, the hinge is deformed and the flat wire is inserted thereto. When the flat wire is attempted to be withdrawn, the hinge is not deformed, but is locked in place.

Accordingly, the hinge is engaged with the recesses formed in the flat wire so that the wire cannot be withdrawn.)

In other words, the center pin separation preventing unit 256 returns to a parallel alignment with the surface of the upper insulating plate 241 after the center pin is inserted through the hollow 254. In a non-limiting aspect shown in FIG. 3, the center pin separation preventing unit 256 has an arrow shape. Also, a plurality of the center pin separation preventing unit 256 are formed around the hollow 254 to prevent the inserted center pin 270 from being withdrawn.

In the non-limiting aspect shown in FIG. 4A and FIG. 4B, the center pin separation unit 256 includes a rotation portion 258 (or a head) and a deforming portion 260 (or a neck). The deforming portion 260 is connected to the hollow 254 and is the portion that bends toward the electrode assembly 200 when the center pin 270 is inserted through the hollow 254. The rotation portion 258 is connected to an end of the deforming portion 260. The rotation portion 258 is rotated toward the electrode assembly 200 about the deforming portion 260 when the center pin 270 is inserted.

In the non-limiting aspect shown, the deforming portion 260 can be a bar having a rectangular shape cross-section, and the rotation portion 258 can be wedged-shaped element with a right triangular cross-section. To further describe the right triangular shape of the rotation portion 258, a side thereof that is perpendicular to the thickness direction of the upper insulating plate 241 is a lower side of the right triangle, a side thereof that is parallel to the thickness direction of the upper insulating plate 241 is a right angled side of the right triangle. As shown, the right angled side is connected to the deforming portion 260.

In a non-limiting aspect, the deforming portion 260 is preferably disposed lower than a central position in the thickness direction of the upper insulating plate 241. In other words, the deforming portion 260 is attached to the rotation portion 258 at a point very near the right angle part of the rotation portion 258. Instead of being attached lower than to the central position, if the deforming portion 260 is disposed at the central position in the thickness direction of the upper insulating plate 241, an angle formed when the deforming portion 260 is deformed toward the upper side of the battery would be similar to an angle formed when the deforming portion 260 is deformed toward the lower side of the battery. In other words, although not required, the center pin separation preventing unit 256 would not be biased or predisposed in favor of bending toward the lower side of the battery and prevent the withdrawal of the center pin 270 if the deforming portion 260 is disposed at the central position.

On the other hand, as the position of the deforming portion 260 is shifted toward the lower side (or the right angle side) of the rotation portion 258 when viewing in the thickness direction of the upper insulating plate 241, as shown in FIG. 4B, the possible angle that the deforming portion 260 can be deformed toward the upper side of the battery (toward the cap assembly 400) becomes gradually small. In other words, as shown in FIG. 4B, (in a gap Y) there will not be enough room for the rotation portion 258 to rotate before running into the wall of the hollow 254 to allow the center pin 270 to be dislodged or withdrawn. Accordingly, rotating the rotation portion 258 upward will cause the inner circumference of the hollow 254 to collide with an upper corner of the rotation portion 258 to prevent the rotation portion 258 from rotating further toward the upper side of the battery.

On the other hand, as shown in FIG. 4B, (in a gap X) there will be enough room for the rotation portion 258 to rotate before running into the wall of the hollow 254 to allow the center pin to be inserted through the hollow 254. Accordingly, rotating the rotation portion 258 downward will not cause the inner circumference of the hollow 254 to collide with a lower corner of the rotation portion 258 to prevent the rotation portion 258 from rotating further toward the lower side of the battery.

In a non-limiting aspect, the length of the deforming portion 260 is preferably shorter than a length of the lower side of the rotation portion 258, but such is not required. As described above, the rotation portion 258 does not rotate much toward the upper side of the battery because the inner circumference of the hollow 254 collides with the upper corner of the rotation portion 258. In order to obtain the most benefit of this effect, it is advantageous that the length of the deforming portion 260 is relatively short. Thus, the length of the deforming portion 260 should still be enough to deform the deforming portion in response to the rotation of the rotation portion 258.

Since the deforming portion 260 is deformed when the center pin 270 is inserted through the hollow 254, the deforming portion 260 must be restored to its initial shape after the insertion of the center pin to lock in the center pin 270. Therefore, the material of the deforming portion 260 is an elastic material. In a non-limiting aspect, the elastic material may be any one of polyethylene terephthalate (PET), polyethylene (PE), polypropylene (PP), polyimide (PI), or like materials, or any combinations thereof. In a non-limiting aspect, the elastic material may be the same as that of the upper insulating plate 241, but such is not required. Accordingly, the materials of the upper insulating plate are not limited to the above-mentioned materials.

It is understood that the cross sectional shape of the deforming portion 260 need not be rectangular and may be any shape, such as circular or irregular. It is understood that the deforming portion 260 need not be triangular and may be any shape, such as a paddle shape or irregular.

Figure 5A:
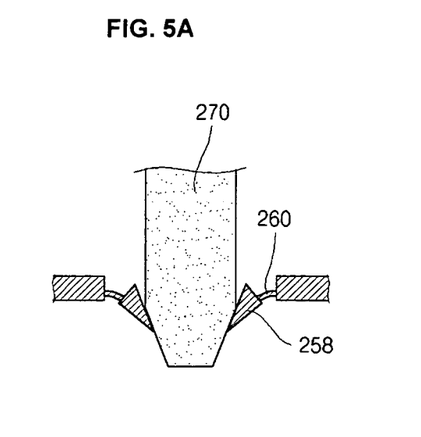
FIG. 5A is a sectional view illustrating the deformation of a center pin separation preventing unit occurred when a center pin starts to be inserted.
Figure 5B:
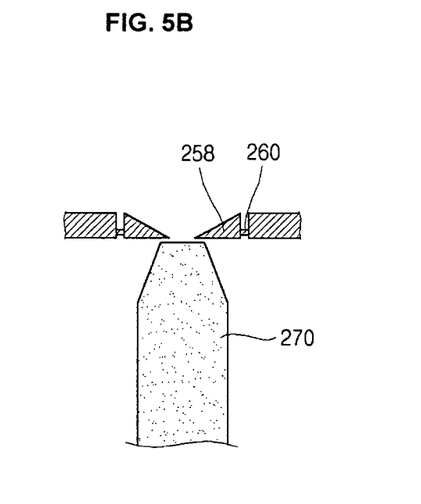
FIG. 5B is a sectional view illustrating the center pin separation preventing unit after the insertion of the center pin.

FIG. 5A is a sectional view illustrating the deformation of a center pin separation preventing unit 256 (shown in FIG. 3) that occurs when the center pin 270 is inserted, and FIG. 5B is a sectional view illustrating the center pin 270 after it is completely inserted through the hollow 254 (shown in FIG. 3) in which the center pin separation preventing unit 256 is formed.

Referring to FIG. 5A, an outer diameter of the hollow 254 is greater than an outer diameter of the center pin 270 to enable insertion of the center pin 270 once the upper insulating plate 241 is installed in the battery. When the center pin 270 is inserted into the hollow 254, a side end of the center pin 270 first contacts an oblique side (the hypotenuse side) of the rotation portion 258 so that the center pin 270 is easily slid downward. Accordingly, during insertion, a force applied to the rotation portion 258 causes the deforming portion 260 to deform, rotate or deflect toward the lower side of the battery. By doing so, the rotation portion 258 rotates toward the lower side of the battery, and the center pin 270 is inserted into a space formed in the electrode assembly 200.

Once the center pin 270 is inserted into the battery, as shown in FIG. 5B, it cannot be protruded, dislodged, or withdrawn back toward the upper side of the battery because the rotation portion 258 holds the end of the center pin 270. As discussed earlier, a counter deformation (rotation or deflection) of the deforming portion 260 is limited by the rotation portion 258. Therefore, even when the external shock (or jolt or blow) is applied to the battery, such as when the battery falls or is dropped, the center pin 270 is prevented from protruding or dislodging out of the electrode assembly 200. Accordingly, the center pin is prevented from striking the safety vent 410, and in turn, the safety vent 410 is prevented from being deformed and/or damaged.

In the aspect shown, the center pin 270 is shown with tapered ends, but such is not required. In another aspect, the center pin 270 may be without the taper, or may have a protruding ring on the end closest to the rotation portion 258 to increase the locking effect. In a non-limiting aspect, one end may be tapered while the other end is not. Various combinations thereof are within the scope of this invention.

In a cylinder type lithium ion secondary battery of a related art, a center pin is inserted into a core of an electrode assembly before an upper insulating plate is inserted into a case, and an electrolyte is injected after a beading is formed in a side plate of the case to fix the upper insulating plate and the electrode assembly 200. On the other hand, in the various aspects of the present invention, the center pin 270 may be inserted into the core of the electrode assembly 200 after injection of the electrolyte. Accordingly, a compressive force is applied to the electrode assembly 200 to reduce a space between the electrode plates 210, 220 and the separator 230, into which the electrolyte has been impregnated. According various aspects of the present invention, the upper insulating plate 241 of the present invention enables the center pin 270 to be inserted after the injection of the electrolyte, and reduces or prevents the impregnation of the electrolyte from being reduced due to the center pin 270.

In various aspects, the upper insulating plate, the center pin, and the case may be variously shaped. Accordingly, the hollows and the recesses may be shaped suitable for the any shaped center pins. In other aspects, center pin separation preventing unit need not be discretely formed, but may be formed as a single piece that may be separated by the insertion of the center pin. In such a case, notches may be formed to aid separation of the single piece into separate units. Also, other types of batteries are within the scope of this invention.

According to the cylinder type lithium ion secondary battery, the center pin separating prevention part is formed in the hollow of the upper insulating plate to be bent only toward the electrode assembly such that the center pin insertion is enabled after the electrolyte injection. Accordingly, it is possible to maintain uniform impregnation of the electrolyte regardless of the application of the center pin, and the inferior impregnation that occurs when the electrolyte is injected after the insertion of the center pin is solved to reduce overall processing time, and to increase productivity. Moreover, when an external shock is applied, it is possible to prevent the safety vent from being damaged due to the strike by the center pin.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. A cylinder type lithium ion secondary battery, comprising:
   an electrode assembly;
   a case accommodating the electrode assembly and having an upper end opening;
   a center pin in a center of the electrode assembly;
   a cap assembly sealing the upper end opening of the case; and
   an upper insulating plate between the electrode assembly and the cap assembly, wherein the upper insulating plate has a hollow having a diameter greater than a maximum diameter of the center pin through which the center pin can penetrate, and
   a center pin separation preventing unit extending into the hollow from the upper insulating plate, wherein the center pin separation preventing unit is effectively bendable to allow the center pin to penetrate therethrough only in a direction toward the electrode assembly, and wherein the center pin is located only outside of the hollow.

2. The cylinder type lithium ion secondary battery as claimed in claim 1, wherein the center pin separation preventing unit extends in a direction substantially parallel to a planar surface of the upper insulating plate.

3. The cylinder type lithium ion secondary battery as claimed in claim 1, wherein the center pin separation preventing unit has an arrow shape.

4. The cylinder type lithium ion secondary battery as claimed in claim 1, comprising a plurality of center pin separation preventing units.

5. The cylinder type lithium ion secondary battery as claimed in claim 1, wherein the center pin separation preventing unit comprises:
   a deforming portion coupled to the upper insulating plate and bendable toward the electrode assembly; and
   a rotation portion coupled to an end of the deforming portion and configured to rotate toward the electrode assembly about the deforming portion.

6. The cylinder type lithium ion secondary battery as claimed in claim 5, wherein the deforming portion is disposed on a lower half of the upper insulating plate in a thickness direction thereof.

7. The cylinder type lithium ion secondary battery as claimed in claim 5, wherein the deforming portion has a rectangular cross-section in a thickness direction of the upper insulating plate.

8. The cylinder type lithium ion secondary battery as claimed in claim 5, wherein the deforming portion comprises an elastic material.

9. The cylinder type lithium ion secondary battery as claimed in claim 8, wherein the elastic material comprises at least one of polyethylene terephthalate (PET), polyethylene (PE), polypropylene (PP), and polyimide (PI).

10. The cylinder type lithium ion secondary battery as claimed in claim 5, wherein the rotation portion has a right triangular cross-section in a radial direction of the upper insulating plate.

11. The cylinder type lithium ion secondary battery as claimed in claim 10, wherein the right triangular shape includes a first side perpendicular to a thickness direction of the upper insulating plate as a lower side thereof and a second side parallel to the thickness direction of the upper insulating plate as a right angled side thereof, and wherein the second side is coupled to the deforming portion.

12. The cylinder type lithium ion secondary battery as claimed in claim 10, wherein a length of the deforming portion is shorter than the first side of the rotation portion.

13. The cylinder type lithium ion secondary battery as claimed in claim 11, wherein the first side is connected to an end of the second side by an oblique side, and wherein the oblique side is obliquely formed at an angle to the second side.

14. The cylinder type lithium ion secondary battery as claimed in claim 1, wherein the upper insulating plate has a plurality of recesses.

15. The cylinder type lithium ion secondary battery as claimed in claim 14, wherein the recesses extend radially away from a center of the upper insulating plate.

16. An insulating plate for a battery having a center pin and an electrode tab the insulating plate comprising:

a first perforation having a diameter greater than a maximum diameter of the center pin;

at least one lock extending into the first perforation and configured to enable only one way passage of the center pin through the at least one lock; and a second perforation configured to accommodate the electrode tab, wherein the center pin is located only outside of the first perforation.

17. The insulating plate as claimed in claim 16, wherein the lock comprises a head and a neck, the neck comprising a first end and a second end, wherein the first end is coupled to the insulating plate and the second end is coupled to the head.

18. The insulating plate as claimed in 17, wherein the neck is coupled to the insulating plate and the head is off-centered with respect to a thickness of the insulating plate.

19. The insulating plate as claimed in claim 16, wherein the battery is a cylinder type lithium ion secondary battery.

20. A lithium ion secondary battery, comprising:

a center pin; and an insulating plate including a hollow having a diameter greater than a maximum diameter of the center pin and a center pin restrainer extending into the hollow from the insulating plate and sufficiently bendable only towards the interior of the lithium ion secondary battery to enable the center pin to penetrate through the hollow in a first direction, wherein the center pin is located only outside of the hollow.

21. The lithium ion secondary battery as claimed in claim 20, wherein the center pin restrainer comprises a first member and a second member, and wherein the first member has a larger cross sectional area than the second member.

22. The lithium ion secondary battery as claimed in claim 21, wherein the second member is shorter than the first member.

23. The lithium ion secondary battery as claimed in claim 21, wherein the first member is configured to contact the center pin when the center pin is inserted into the first perforation.

24. The lithium ion secondary battery as claimed in claim 20, wherein contact between the center pin restrainer and the insulating plate prevents the center pin from penetrating through the center pin restraint in a second direction substantially opposite to the first direction.

* * * * *